US007606300B2

(12) United States Patent
Lim

(10) Patent No.: US 7,606,300 B2

(45) Date of Patent: Oct. 20, 2009

(54) APPARATUS AND METHOD FOR SETTING TAP COEFFICIENT OF ADAPTIVE EQUALIZER

(75) Inventor: Hyun-Wook Lim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 581 days.

(21) Appl. No.: 11/346,962

(22) Filed: Feb. 3, 2006

(65) Prior Publication Data

US 2006/0176947 A1 Aug. 10, 2006

(30) Foreign Application Priority Data

Feb. 7, 2005 (KR) ..................... 10-2005-0011299

(51) Int. Cl.
*H03H 7/30* (2006.01)

(52) U.S. Cl. ........................ 375/232; 375/229; 375/231

(58) Field of Classification Search ................. 375/229, 375/230, 231, 232
See application file for complete search history.

(56) References Cited

U.S. PATENT DOCUMENTS

| | | | | |
|---|---|---|---|---|
| 5,892,695 | A * | 4/1999 | Van Dalfsen et al. | 708/313 |
| 6,445,733 | B1 * | 9/2002 | Zuranski et al. | 375/231 |
| 6,731,443 | B2 | 5/2004 | Bliss et al. | |
| 6,747,936 | B1 * | 6/2004 | Shim | 369/59.22 |
| 7,061,848 | B2 * | 6/2006 | Shim | 369/59.22 |
| 2002/0012306 | A1 * | 1/2002 | Hayami et al. | 369/59.21 |
| 2004/0202081 | A1 * | 10/2004 | Shim | 369/59.22 |
| 2004/0257954 | A1 * | 12/2004 | Ohkubo et al. | 369/59.21 |
| 2005/0219727 | A1 * | 10/2005 | Kajiwara et al. | 360/39 |

FOREIGN PATENT DOCUMENTS

| | | |
|---|---|---|
| JP | 05-102793 | 4/1993 |
| KR | 1020000021518 | 4/2000 |
| KR | 1020030090168 | 11/2003 |
| TW | 200423649 | 11/2004 |
| TW | 200501686 | 1/2005 |

* cited by examiner

*Primary Examiner*—Chieh M Fan
*Assistant Examiner*—Jaison Joseph
(74) *Attorney, Agent, or Firm*—F. Chau & Associates, LLC

(57) ABSTRACT

There is provided an apparatus and method for initializing a tap coefficient of an adaptive equalizer constituting a read path for a storage medium, where the apparatus includes an FIR filter, a Viterbi decoder, a level error detector, and a tap coefficient updater, the FIR filter receives a first signal stream and outputs the first signal stream in the form of a second signal stream, the Viterbi decoder corrects a bit error of the second signal stream, the level error detector detects a level error between the second signal stream and a third signal stream that is an ideal output signal corresponding to the second signal stream, the tap coefficient updater selects a tap coefficient minimizing the level error and provides the selected tap coefficient as a tap coefficient of the FIR filter, the tap coefficient minimizing the level error is determined as an initial value in a system initialization mode, and the determined initial value is used as an initial value of the tap coefficient of the FIR filter in a normal operation mode.

19 Claims, 4 Drawing Sheets

AFE OUTPUT
$\{x_k\}$
FIR FILTER
100
$\{y_k\}$
TAP COEFFICIENT UPDATER
110
INITIAL COEFFICIENT
VITERBI DECODER
120
$\{z_k\}$
REPRODUCED DATA
BER DETECTOR
130

AFE OUTPUT OF TRAINING PATTERN
{x'k}
FIR FILTER
200
TAP COEFFICIENT UPDATER
210
{y'k}
VITERBI DECODER
220
{zk}
REPRODUCED DATA
BER DETECTOR
230
TRAINING PATTERN {xk}
PR GENERATOR
240
{yk}
DELAY ADJUSTER
250
260
{ek}
DELAY TIME CONTROL
MSE DETECTOR
270

APPARATUS AND METHOD FOR SETTING TAP COEFFICIENT OF ADAPTIVE EQUALIZER

BACKGROUND OF THE INVENTION

1. Field of the Invention

The present disclosure relates to equalizers used for reproduction of digital data, and more particularly, to an apparatus and method for initializing an adaptive equalizer used in a partial response maximum likelihood filter.

2. Description of the Related Art

Generally, in hard disk drives (HDDs) and optical disk drives (ODDs), during an operation of reading and reproducing stored data, high-rate data transmission from a physical storage medium through a limited bandwidth is performed, and thus distorted data containing inter-symbol interference (ISI) is obtained. In order to recover originally stored digital data from the distorted data, a level error is corrected through a partial response (PR) method to shape digital data on which a data operation can be performed. The shaped digital data is decoded into the originally-stored digital data by a Viterbi decoding scheme using a maximum likelihood (ML) method, and is thus error-corrected on a bit basis.

In these storage mediums recovering the stored data by a partial response maximum likelihood (PRML) method, a level error is minimized using a finite impulse response (FIR) digital filter. A Viterbi decoder performs an ML bit error correction operation using the minimum path. For the optimal error correction operation, an FIR filter needs to perform a waveform equalization operation for correcting the distorted data to a level that is required for data processing in the Viterbi decoder. In an adaptive equalizer used for the above purpose, a tap coefficient of the equalizer is automatically adapted and updated using an output signal of the Viterbi decoder. In this adaptive tap coefficient updating method, consideration of a delay in the Viterbi decoder and optimization of an initial convergence coefficient in the equalizer must be properly performed.

In the case of a PRML system having a relatively small fluctuation of a channel characteristic, a separate test mode for setting an initial value of the equalizer is provided to make it possible to use the optimal one of the preset initial values. However, this initial value setting method may not show an optimal bit error rate (BER) performance during an initial convergence operation of the equalizer and in a Viterbi decoder using the initial convergence operation. Moreover, in an actual operation environment, the initial value setting method may cause system instability due to the divergence of the equalizer that results from an improper initial value caused by a change in temperature and electromagnetic environments.

FIG. 1 is a block diagram illustrating a method for initializing a conventional adaptive equalizer. Referring to FIG. 1, the conventional adaptive equalizer includes an FIR filter 100, a tap coefficient updater 110, a Viterbi decoder 120, and a BER detector 130. Analog data read out from a storage medium, such as a disk, is converted by an analog-to-digital converter (ADC) into an analog front end (AFE) output data stream $\{x_k\}$. The FIR filter 100 converts the AFE output data stream $\{x_k\}$ into digital data of a processible level. The tap coefficient updater 110 determines optimal tap coefficients of the FIR filter 100 in response to an external control signal, and provides tap coefficient weights for the optimal tap coefficients to the FIR filter 100. The Viterbi decoder 120 corrects a bit error of a digital data stream $\{y_k\}$ outputted from the FIR filter 100. The BER detector 130 detects a BER of the error-corrected data stream $\{z_k\}$ outputted from the Viterbi decoder 120.

The analog data stored on the storage medium is physically detected at a high speed. The detected analog data is transmitted through a narrow-bandwidth channel to the ADC at a high speed, and is converted by the ADC into the AFE output data stream $\{x_k\}$ that is near to digital data. Unfortunately, the AFE output data stream $\{x_k\}$ still contains an ISI and is thus improper to be processed into digital data.

The FIR filter 100 is a kind of transversal digital filter having an FIR property, and is used to minimize a noise effect and an ISI of an input signal.

The FIR filter 100 guarantees stability because it has no feedback loop. Also, the FIR filter satisfies a linear phase property. Accordingly, the FIR filter 100 is widely used in applications that attach importance to waveform data such as the PRML of data transmission or a storage medium. The filtering property of the FIR filter 100 is determined by tap coefficients that are weights of delay taps thereof. Properly-determined tap coefficients make it possible to shape the incomplete digital data into a complete digital data, thereby minimizing the level error.

The tap coefficient updater 110 has an adaptive property that the tap coefficient is converged on a value enabling optimal performance according to the environment-dependent property of the FIR filter 100. That is, the tap coefficient updater 110 selects a tap coefficient set enabling the optimal data reproduction and provides it to the FIR filter 100.

The Viterbi decoder 120 corrects the bit error of the digital data stream $\{y_k\}$ outputted from the FIR filter 100. The Viterbi decoding is one of the schemes for realizing the maximum-likelihood (ML) decoding of convolution codes to provide the optimal performance for the convolutional codes.

The BER detector 130 calculates a BER of the error-corrected data stream $\{z_k\}$ that is induced on a read path. That is, the BER detector 130 calculates a rate of erroneous bits to the total bits of read data, and provides the calculated rate as a control signal for maintaining a proper system state.

In the conventional equalizer initializing method, during the manufacturing process for the product, the tap coefficient set of the equalizer is stored in a register and a tap coefficient providing the optimal BER performance is selected and fixed at an initial tap coefficient. However, this method needs a separate process for initializing the equalizer and a time required for finding the optimal tap coefficient. Also, there is a strong possibility that the so-determined tap coefficient may reflect only an initialized environment, failing to reflect an environment where the product is to be actually used. Moreover, the predetermined tap coefficient may be an initial value that is based on an incorrect BER detection caused by noise and/or changes in temperature and electromagnetic environments during the corresponding test process.

SUMMARY OF THE INVENTION

The present disclosure provides a system that improves efficiency by reducing a separate initialization operation of an equalizer during the manufacturing process thereof, to provide stable reproduction of data. In the system, the optimal tap coefficient of the equalizer is automatically found in an environment used during an initial power supply mode of a storage medium, and the found optimal tap coefficient is used as an initial tap coefficient in a normal mode of the equalizer. In addition, the most-optimized tap coefficient for an actual operation environment is provided to the equalizer.

Embodiments of the present disclosure provide an apparatus for initializing a tap coefficient of an adaptive equalizer constituting a read path for a storage medium. The apparatus includes an FIR filter, a tap coefficient updater, a Viterbi decoder, a BER detector, a PR generator, a delay delayer, a level error detector, and a mean squared error (MSE) detector. The FIR filter reproduces a digital data stream by minimizing distortion and an ISI of an inputted AFE data stream. The tap coefficient updater updates a tap coefficient of the adaptive equalizer on the basis of a level error signal. The Viterbi decoder corrects a bit error of the output digital data stream of the FIR filter. The BER detector calculates a bit error of reproduced data. The PR generator generates an ideal output of the FIR filter with respect to a training pattern stream. The delay adjuster generates delay time as much as a delay of a signal passing through the FIR filter. The level error detector detects a difference between the same test data output signals passing through different paths. The MSE detector detects a MSE between the same test data output signals passing through different paths.

In some embodiments, the PR generator converts inputted test data into ideal output data of the FIR filter. In further embodiments, the delay adjuster delays an inputted data stream by a time delay of when the MSE detector detects the minimal MSE. In still further embodiments, the tap coefficient updater selects a tap coefficient set minimizing an inputted difference signal corresponding to a level error, and provides the selected tap coefficient set to the FIR filter.

In a tap coefficient initialization method using the above construction, the delay adjuster adjusts time synchronization for data passing through the FIR filter and the PR generator. Then, the tap coefficient updater detects and stores a tap coefficient for minimizing the level errors of the two resulting signals.

BRIEF DESCRIPTION OF THE DRAWINGS

The accompanying drawings, which are included to provide a further understanding of the invention and are incorporated in and constitute a part of this application, illustrate exemplary embodiments of the invention and together with the description serve to explain principles thereof. In the drawings.

DETAILED DESCRIPTION OF PREFERRED EMBODIMENTS

Reference will now be made in detail to the preferred embodiments of the present invention, examples of which are illustrated in the accompanying drawings. It shall be understood that the present invention is not limited to the embodiments illustrated herein after, and the embodiments are rather introduced to promote easy and complete understanding of the scope and spirit of the present invention.

Figure 1:
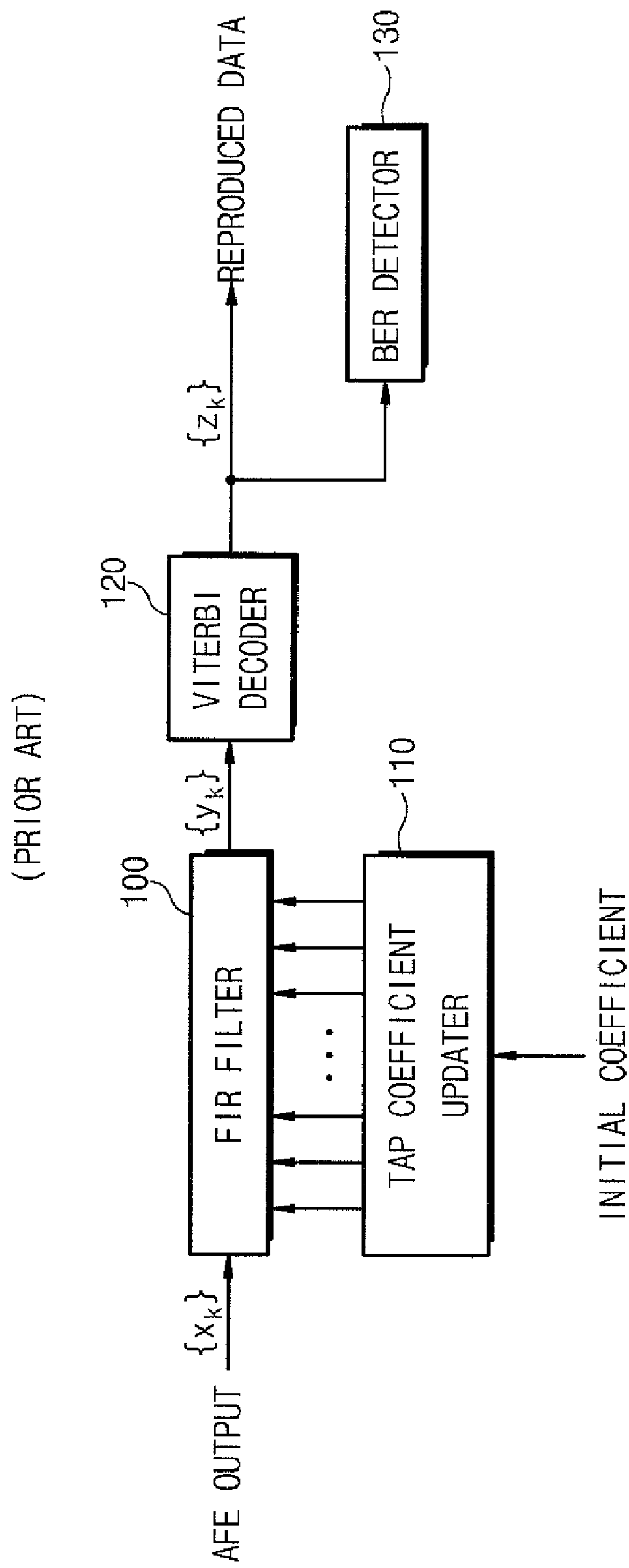
FIG. 1 is a block diagram illustrating a method for initializing a conventional adaptive equalizer.
Figure 2A:
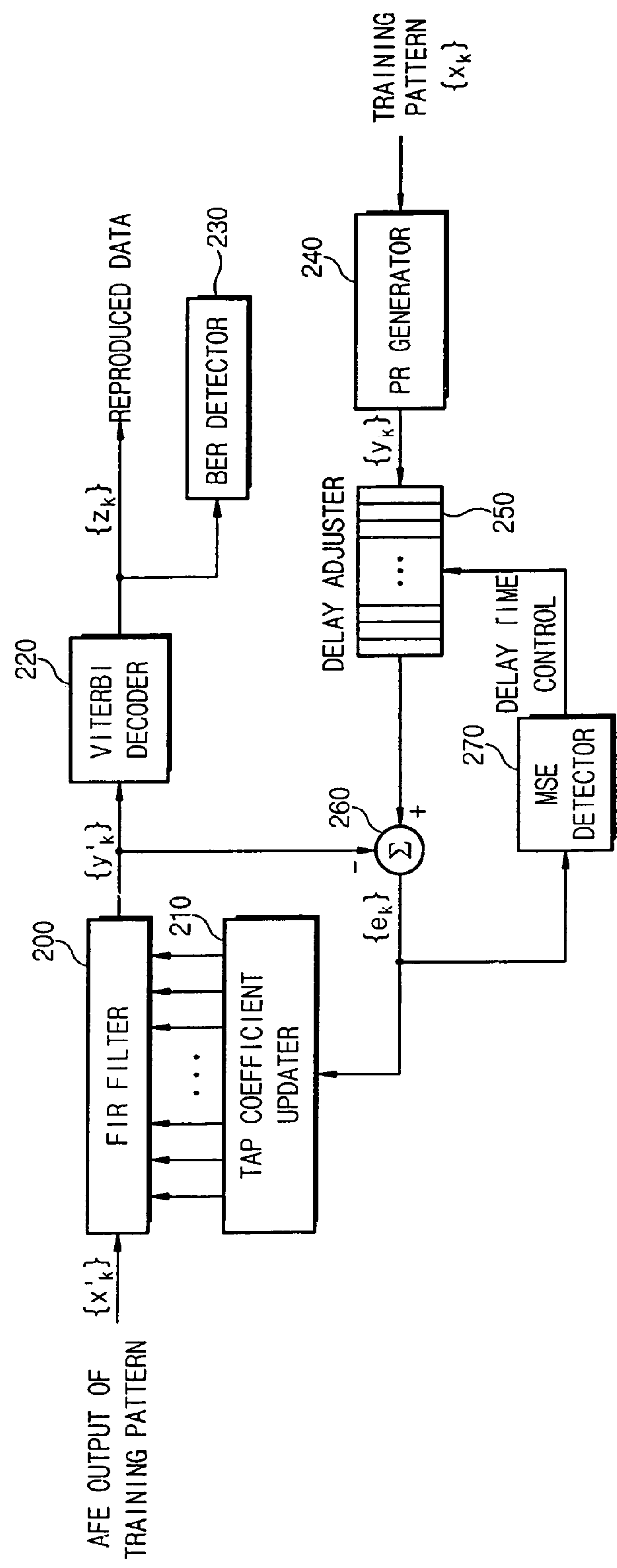
FIG. 2A is a block diagram illustrating an apparatus and method for initializing a tap coefficient of an adaptive equalizer according to an embodiment of the present disclosure.

FIG. 2A is a block diagram illustrating an apparatus and method for initializing a tap coefficient of an adaptive equalizer according to an embodiment of the present disclosure. Referring to FIG. 2A, the tap coefficient initializing apparatus includes an FIR filter 200, a tap coefficient updater 210, a Viterbi decoder 220, a BER detector 230, a partial response (PR) generator 240, a delay adjuster 250, a level error detector, and a mean square error (MSE) detector 270. The delay adjuster 250 and the MSE detector 270 adjust a delay occurring while an AFE output signal $\{x'_k\}$ of a training pattern signal $\{x_k\}$ passes through the FIR filter 200, thereby synchronizing the AFE output signal $\{x'_k\}$ with the training pattern signal $\{x_k\}$. When the two signals are synchronized with each other, the tap coefficient updater 210 repeats a convergence operation until a level error of the two signals is minimized. A tap coefficient set providing the minimum level error is stored in a memory and is determined as initial coefficient values of the equalizer.

An initial test data is pre-stored on a storage medium. In an initialization mode, the pre-stored initial test data is read out from the storage medium and is then converted by an ADC into the AFE output signal $\{x'_k\}$. The FIR filter 200 serves as a transversal FIR digital filter that reproduces the AFE output signal $\{x'_k\}$ into a digital data stream $\{y'_k\}$. That is, the FIR filter 200 minimizes a level error of the AFE output signal $\{x'_k\}$ to output the digital data stream $\{y'_k\}$.

The Viterbi decoder 220 corrects a bit error of the digital data stream $\{y'_k\}$ to reproduce an error-corrected data stream $\{z_k\}$. The Viterbi decoding is one of schemes for realizing the maximum-likelihood (ML) decoding of convolution codes to provide the optimal performance for the convolutional codes.

The BER detector 230 calculates a BER of the error-corrected data stream $\{z_k\}$. That is, the BER detector 230 calculates a rate of erroneous bits to the total bits of the error-corrected data stream $\{z_k\}$, thereby measuring the data reproduction performance of the system.

The PR generator 240 receives the training pattern stream $\{x_k\}$ and shapes the training pattern $\{x_k\}$ into an ideal output data stream $\{y_k\}$ of the FIR filter 200. The delay adjuster 250 serves as a variable delayer that compensates for a difference between a delay occurring while the AFE output signal $\{x'_k\}$ passes through the FIR filter 200 and a delay occurring while the training pattern stream $\{x_k\}$ passes through the PR generator 240.

The level error detector 260 subtracts the ideal output data stream $\{y_k\}$ from the digital data stream $\{y'_k\}$ to output a level error $\{e_k\}$. The optimal filtering performance of the FIR filter 200 causes the minimum level error.

The MSE detector 270 calculates an MSE value on the basis of the level error $\{e_k\}$ corresponding to a level difference between two input data streams. The MSE detector 270 outputs a small MSE value with respect to input data streams having a low correlation. The generation of the minimum MSE value means that the two input signals of the lever error detector 260 are synchronized with each other. The delay adjuster 250 delays the ideal output data stream $\{y_k\}$ by a delay value corresponding to the minimum MSE value. In order to detect a synchronized level of two signals, the MSE detector 270 may be implemented by a signal-to-noise ratio (SNR) detector that outputs a large SNR value when the two input signals are completely synchronized with each other. In this case, the delay adjuster 250 delays the ideal output data stream $\{y_k\}$ by a delay value corresponding to the maximum SNR value, thereby synchronizing the two input signals of the level error detector 260.

In order to minimize an error with reference to the level error $\{e_k\}$, the tap coefficient updater 210 converges the tap coefficient at the optimal value through an adaptive algorithm. For example, the adaptive algorithm may include a least mean square (LMS) algorithm or a recursive least square (RLS) algorithm.

In the tap coefficient initializing method, the training pattern $\{x_k\}$ is stored on the storage medium in response to a write command when the system is booted, and an initialization operation is started in response to a read command on the stored training pattern $\{x_k\}$, thereby generating the AFE output signal $\{x'_k\}$. The AFE output signal $\{x'_k\}$ is an ADC-converted signal. However, the AFE output signal $\{x'_k\}$ still contains an ISI and a distortion, and is thus improper to be processed by the Viterbi decoder 220. The ISI and the distortion of the AFE output signal $\{x'_k\}$ are removed in some degree by the FIR filter 200, thereby generating the digital data stream $\{y'_k\}$. The digital data stream $\{y'_k\}$ has the same level and shape as the ideal output data stream $\{y_k\}$ into which the training pattern stream $\{x_k\}$ is shaped by the PR generator 240 according to a properly-selected tap coefficient. Some delay difference exists between the digital data stream $\{y'_k\}$ and the ideal output data stream $\{y_k\}$. It is necessary to compensate for the delay difference so as to find the proper tap coefficient. For this purpose, a delay of the ideal output data stream $\{y_k\}$ is controlled by the delay adjuster 250 until the minimum MSE is obtained. Thereafter, the tap coefficient adjuster 210 performs the convergence operation until the minimum level error signal $\{e_k\}$ is obtained. A tap coefficient, which is converged when the minimum level error signal $\{e_k\}$ is obtained, is stored in a main or auxiliary memory of the system and is set to be used as the initial value in the normal mode. This initial tap coefficient value makes it possible to improve the initial convergence property and the data reproduction efficiency. The initial tap coefficient value is extracted when the system is booted. Thereafter, a tap coefficient convergence process in the normal mode is performed.

Figure 2B:
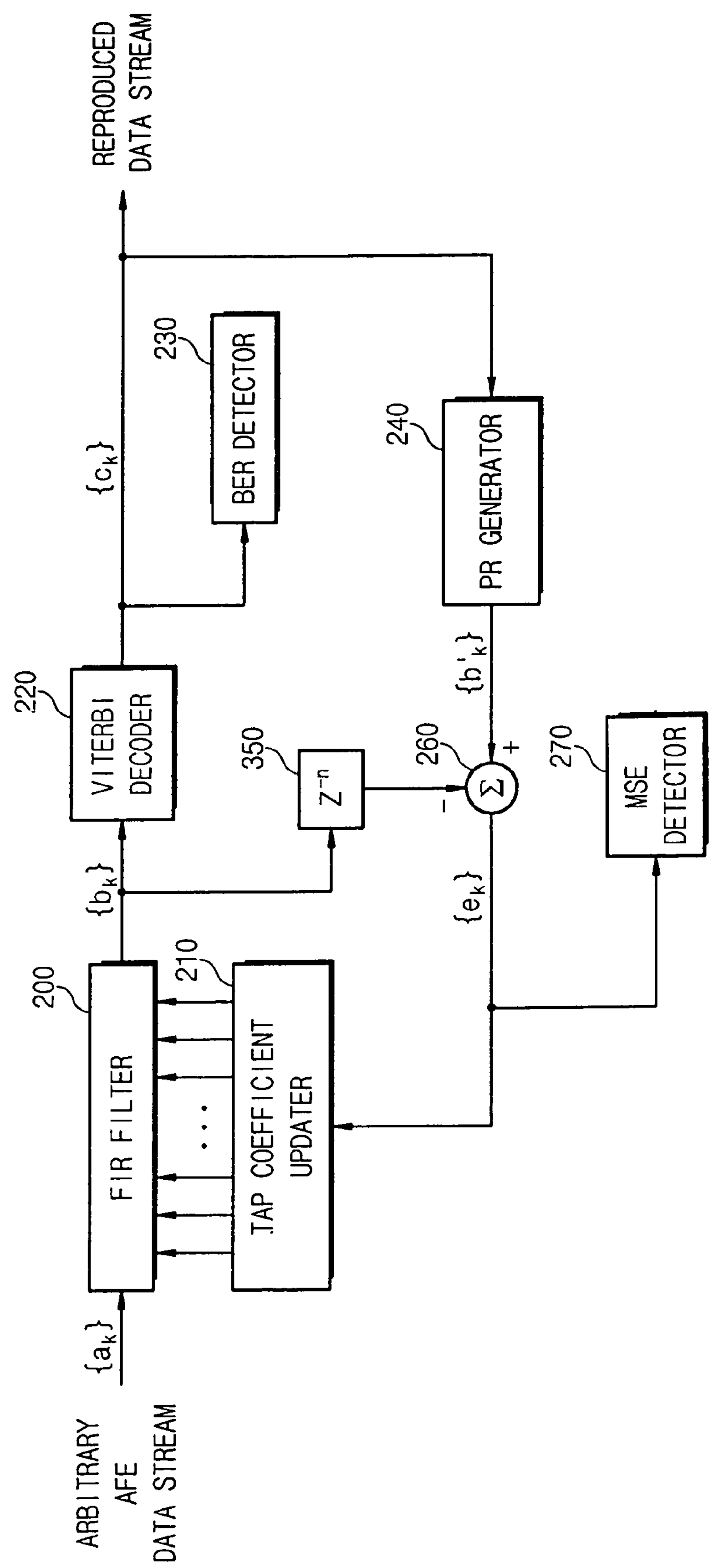
FIG. 2B is a block diagram illustrating an apparatus and method for updating a tap coefficient of an adaptive equalizer in a normal mode according to an embodiment of the present disclosure.

FIG. 2B is a block diagram illustrating an apparatus and method for updating a tap coefficient of an adaptive equalizer in the normal mode according to an embodiment of the present disclosure. In FIGS. 2A and 2B, like reference numerals denotes like elements, and thus their detailed description will be omitted for conciseness.

Referring to FIG. 2B, the tap coefficient updating apparatus includes the FIR filter 200, the tap coefficient updater 210, the Viterbi decoder 220, the PR generator 240, the level error detector 260, the BER detector 270, and a delayer 350. The FIR filter, 200 corrects a lever error of an arbitrary AFE output signal $\{a_k\}$ corresponding to an arbitrary data signal that is read from the storage medium after completion of the tap coefficient initialization illustrated in FIG. 2A. The Viterbi decoder 220 performs an error correcting operation on a digital data stream $\{b_k\}$ outputted from the FIR filter 200. The BER detector 270 detects a BER of an error-corrected data stream $\{c_k\}$ outputted from the Viterbi decoder 220. The delayer 350 generates a delay as much as the delay time occurring while the digital data stream $\{b_k\}$ passes through the Viterbi decoder 220 and the PR generator 240.

The tap coefficient of the FIR filter 200 is set at the initial value that has been set in the initialization mode. The set tap coefficient is updated to reflect an environment of the normal mode. In the normal mode, the tap coefficient of the equalizer is updated using the arbitrary AFE output signal $\{a_k\}$, not the training pattern $\{x_k\}$ illustrated in FIG. 2A.

The delayer 350 implements timing synchronization by reflecting the delays occurring while the digital data stream $\{b_k\}$ passes through the Viterbi decoder 220 and the PR generator 240. In the normal mode, the delays occurring due to the Viterbi decoder 220 and the PR generator 240 are detected, and the delayer 350 may be implemented by a delay circuit having a fixed delay value corresponding to the detected delays.

The tap coefficient updating method includes: an operation of correcting, at the FIR filter 200, the level error of the arbitrary AFE data stream $\{b_k\}$ to output the digital data stream $\{b_k\}$; an operation of error-correcting, at the Viterbi decoder 220, the arbitrary AFE data stream $\{b_k\}$ to output the error-corrected data stream $\{c_k\}$; an operation of inputting the error-corrected data stream $\{c_k\}$ into the PR generator 240 so as to detect the level error; an operation of subtracting a time-synchronized output data stream $\{b_k\}$ of the delayer 350 from an ideal output data stream $\{b'_k\}$ of the PR generator 240 to detect the level error; and an operation of repeating the tap coefficient convergence operation until the level error is minimized.

The conversion of the initialization mode into the normal mode may be easily implemented by a selection circuit for selecting one of paths through which the arbitrary AFE data stream $\{b_k\}$ is inputted into the delayer 350 or the level error detector 260, a selection circuit for selecting one of the error-corrected data stream $\{c_k\}$ and the training pattern $\{x_k\}$ as an input of the PR generator 240, and a selection circuit for selecting one of paths through which the ideal output data stream $\{y_k\}$ is inputted through the delay adjuster 250 into the level error detector 260 or directly inputted into the level error detector 260. The selection circuits may be implemented by a multiplexer or a switching element.

By the above constructions and operations, the optimal initial value of the equalizer is set to reflect the use environment of the system in real time. The tap coefficient of the equalizer is continuously updated to reflect a change in the use environment of the system on the basis of the set optimal initial value, thereby guaranteeing an efficient and rapid convergence operation.

Figure 3:
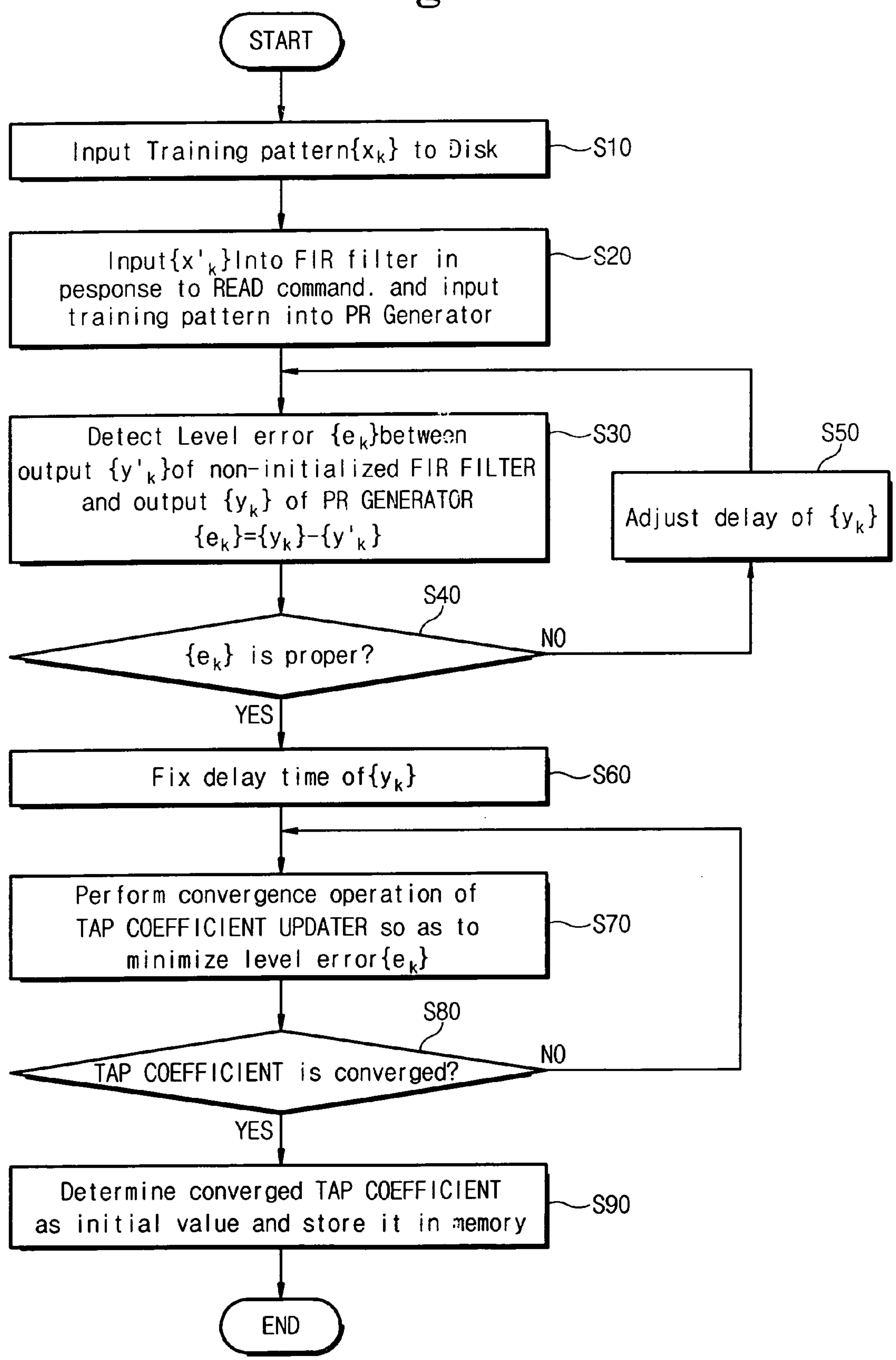
FIG. 3 is a flowchart illustrating a method for initializing a tap coefficient of an adaptive equalizer according to an embodiment of the present disclosure.

FIG. 3 is a flowchart illustrating a method for initializing a tap coefficient of an adaptive equalizer according to an embodiment of the present disclosure. The initialization operations are performed such that data transmission and reproduction optimal for current temperature and electromagnetic environments is secured under the control of firmware when the system is booted or supplied with power.

Referring to FIGS. 2 and 3, when the system is booted, the training pattern $\{x_k\}$ is inputted into and stored on the disk in operation S10. In operation S20, a stored analog signal is detected by a head in response to a read command, the detected analog signal is inputted into the AFE, such as the ADC, the AFE output signal $\{x'_k\}$ containing the distortion and the ISI is outputted from the AFE and is inputted into the non-initialized FIR filter 200, and simultaneously the training pattern $\{x_k\}$ is inputted into the PR generator 240. In operation S30, the level error $\{e_k\}$ between the AFE output signal $\{x'_k\}$ of the FIR filter 200 and the ideal output data stream $\{y_k\}$ of the PR generator 240 is detected by the level error detector 260. In operations S40 and S50, the delay of the ideal output data stream $\{y_k\}$ is adjusted by the delay adjuster 250 until the level error $\{e_k\}$ is lowered below a proper level. In operation S60, when the proper level error $\{e_k\}$ is generated to synchronize the two signals, the synchronization between the two signals is maintained by fixing the delay time of the ideal output data stream $\{y_k\}$. In operation S70, the tap coefficient of the FIR filter 200 is adjusted to minimize the level error $\{e_k\}$ of the two synchronized data signals. The tap coefficient updater 210 repeats the convergence operation by changing an internal tap coefficient set until the level error $\{e_k\}$ is minimized. In operation S80, when the level error $\{e_k\}$ does not decrease any more, it is determined that the tap coefficient has been converged in the initialization mode. In operation S90, the converged tap coefficient is determined as the initial value and is stored in the memory. After completion of the above initialization operations, the stored tap coefficient is read from the memory and is applied to the FIR filter in the normal mode, thereby enhancing the initialization efficiency for the adaptive equalizer and stabilizing the characteristic of the system.

In summary, the level error $\{e_k\}$, between the ideal output data stream $\{y_k\}$ corresponding to the training pattern $\{x_k\}$ and the AFE output signal $\{y'_k\}$ containing the distortion and the ISI, is detected during the booting mode in the actual operation environment of the system, and the tap coefficient updater 210 repeats the convergence operation until the detected level error $\{e_k\}$ is minimized. When the level error $\{e_k\}$ does not decrease any more, the converged tap coefficient is set as the initial value of the tap coefficient. Accordingly, the most optimal tap coefficient for the actual operation environment is provided to enhance the convergence speed of the equalizer and reduce a probability in the divergence of the equalizer due to an erroneous initial value of the tap coefficient. Consequently, reliable data reproduction can be secured.

As described above, the tap coefficient initialization is performed in the actual operation environment, not during the manufacturing process, thereby making it possible to provide the adaptive equalizer with the optimal initial value that maximally reflects the use environment of the system. The optimal initial value makes it possible to reduce the convergence time of the adaptive equalizer and to prevent the unstable data reproduction that may be caused by the deviation of the tap coefficient from the actual operation environment.

It will be apparent to those skilled in the pertinent art that various modifications and variations can be made in embodiments of the present invention. Thus, it is intended that the present invention covers all such modifications and variations provided they come within the scope of the appended claims and their equivalents.

What is claimed is:

1. An adaptive equalizer constituting a read path for a storage medium, the adaptive equalizer comprising:

a finite impulse response (FIR) filter for receiving a first signal stream and outputting the first signal stream in the form of a second signal stream;

a Viterbi decoder for correcting a bit error of the second signal stream;

a level error detector for detecting a level error between the second signal stream and a third signal stream that is an ideal output signal corresponding to the second signal stream;

a tap coefficient updater for selecting a tap coefficient minimizing the level error and providing the selected tap coefficient as a tap coefficient of the FIR filter; and a partial response (PR) generator for generating the third signal stream from a training pattern, wherein the tap coefficient minimizing the level error is determined as an initial value in a system initialization mode, and the determined initial value is used as an initial value of the tap coefficient of the FIR filter in a normal operation mode.

2. The adaptive equalizer of claim 1, wherein the first signal stream is a signal stream containing a distortion and an inter-symbol interference (ISI), the signal stream being generated by storing a training pattern on the storage medium and reading the stored training pattern from the storage medium.

3. The adaptive equalizer of claim 1, wherein the second signal stream is a digital data stream, the digital data being reproduced by suppressing the distortion and the ISI of the first signal stream according to the setting of the tap coefficient.

4. The adaptive equalizer of claim 1, further comprising a delay adjuster for synchronizing the first signal stream and the third signal stream.

5. The adaptive equalizer of claim 1, wherein an output of the Viterbi decoder is inputted into the PR generator and thus the tap coefficient is converged using a common data not the training pattern.

6. A method for initializing a tap coefficient of an adaptive equalizer, the method comprising:

writing a training pattern on a storage medium in a system booting mode;

obtaining an analog front end (AFE) signal stream containing a distortion and an interference in response to a read command;

filtering the AFE signal stream by an FIR filter;

synchronizing a data stream passing through the FIR filter and an ideal data stream into which the training pattern is shaped, wherein the ideal data stream is generated from the training pattern using a partial response generator;

detecting a level error between the synchronized ideal data stream and the data stream passing through the FIR filter;

converging a tap coefficient of the adaptive equalizer until the level error is minimized; and setting a tap coefficient corresponding to the minimized level error as an initial value of the tap coefficient of the adaptive equalizer.

7. The method of claim 6, wherein the ideal form of the ideal data stream is a level form that is obtained by completely removing the distortion and the interference by the FIR filter.

8. The method of claim 6 wherein initializing the tap coefficient is performed subsequent to manufacturing in the actual operating environment.

9. The method of claim 6, further comprising detecting a stored analog signal in response to a read command.

10. The method of claim 9, further comprising inputting the detected signal into the AFE.

11. The method of claim 6 wherein the AFE comprises an analog-to-digital converter (ADC).

12. The method of claim 6, further comprising:

outputting an AFE output signal containing at least one of distortion or inter-symbol interference (ISI) from the AFE; and inputting the AFE output signal into a non-initialized FIR filter and simultaneously inputting the training pattern into a partial response (PR) generator.

13. The method of claim 12, detecting a level error comprising detecting the level error between the AFE output signal of the FIR filter and the ideal output data stream of the PR generator.

14. The method of claim 6, further comprising adjusting the delay of the ideal data stream by a delay adjuster until the level error is lowered below a proper level.

15. The method of claim 6, further comprising maintaining synchronization between the two signals by fixing the delay time of the ideal output data stream when the proper level error is generated.

16. The method of claim 6, further comprising adjusting a tap coefficient of the FIR filter to minimize the level error of the two synchronized data signals.

17. The method of claim 6, further comprising repeating the convergence operation by changing an internal tap coefficient set until the level error is minimized.

18. The method of claim 6, further comprising determining that the tap coefficient has been converged in the initialization mode when the level error does not decrease further.

19. An adaptive equalizer disposed in a read path for a storage medium, the adaptive equalizer comprising:

training means for writing a training pattern to the storage medium;

filtering means in signal communication with the training means for filtering an analog front end signal stream by receiving a first signal stream and outputting a second signal stream filtered with a finite impulse response;

decoding means in signal communication with the filtering means for correcting a bit error of the second signal stream;

synchronizing means for synchronizing the first signal stream passing through the filter with a third signal stream indicative of a shaped training pattern;

detecting means for detecting a level error between the second signal stream and the third signal stream, which is an ideal output signal corresponding to the second signal stream;

updating means for converging a tap coefficient of the filtering means until the level error is minimized and setting a tap coefficient corresponding to the minimized level error as an initial value of the tap coefficient of the adaptive equalizer, and partial response (PR) generating means for generating the third signal stream from the training pattern.

* * * * *